United States Patent

Wilson

[11] Patent Number: 5,316,314
[45] Date of Patent: May 31, 1994

[54] SPORTS EQUIPMENT

[76] Inventor: John Wilson, 101 John St., Worksop S80 1TH, England

[21] Appl. No.: 917,125

[22] PCT Filed: Feb. 6, 1990

[86] PCT No.: PCT/GB91/00181
§ 371 Date: Aug. 5, 1992
§ 102(e) Date: Aug. 5, 1992

[87] PCT Pub. No.: WO91/12055
PCT Pub. Date: Aug. 22, 1991

[30] Foreign Application Priority Data
Feb. 6, 1990 [GB] United Kingdom ............ 9002599

[51] Int. Cl.$^5$ .............................. A63B 63/00
[52] U.S. Cl. ................................. 273/400
[58] Field of Search ....................... 273/400, 411

[56] References Cited

U.S. PATENT DOCUMENTS 3,756,115  9/1973  Schulpin ................. 85/5 R
4,407,507  10/1983 Caruso et al. ............ 273/400
4,728,068  3/1988  Rivkin ................. 248/220.4

FOREIGN PATENT DOCUMENTS 522471   1/1980  Australia .
0176317  4/1986  European Pat. Off. .
1910844  9/1970  Fed. Rep. of Germany .
1578540  11/1970 Fed. Rep. of Germany .
2551982  3/1985  France .
2140069  11/1984 United Kingdom .
2199883  7/1988  United Kingdom .

Primary Examiner—William H. Grieb
Attorney, Agent, or Firm—Trexler, Bushnell, Giangiorgi & Blackstone

[57] ABSTRACT

The invention relates to sports equipment, and particularly to goals as used in a variety of sports for actual playing and for practice. Hitherto such goals have been provided with posts and crossbars each of a required length to create a goal of a required size and with hook members secured such as by welding or screwing to secure the edge of a net. An object of the invention is to provide an improved means of securing a net, and is met by a construction comprising a fitting having a first part to engage in and behind a hole formed in the wall of a goal post or crossbar extending to a shoulder at the end of a second part to lie externally of the goal post or crossbar and having a hook-like formation to create a recess in which an edge of the net can be engaged, the first and second parts having axial holes to receive a rod-like component to ensure engagement of the first part behind the hole.

6 Claims, 2 Drawing Sheets

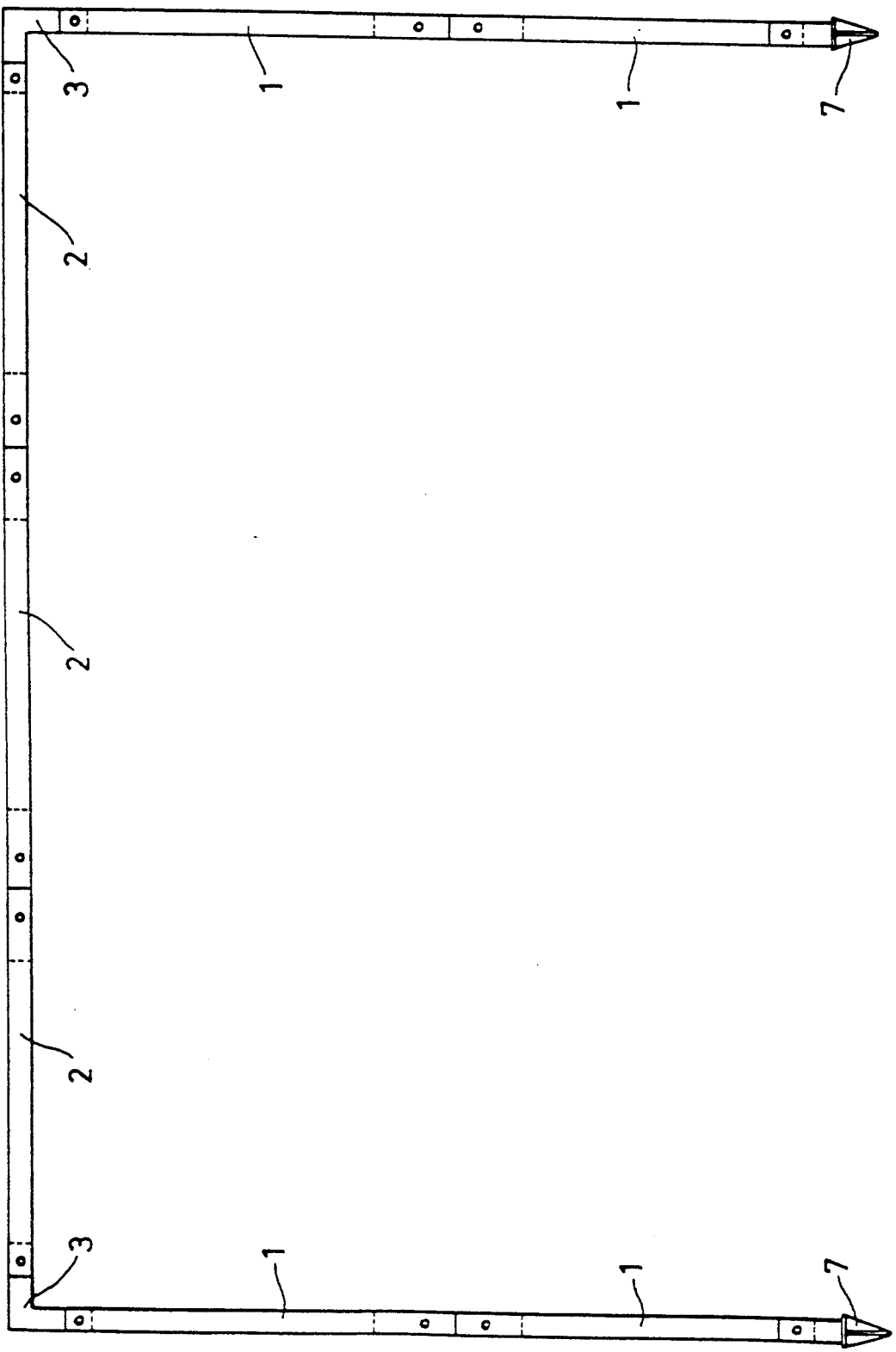

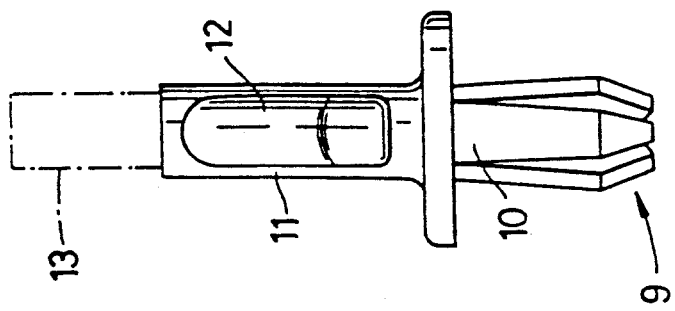
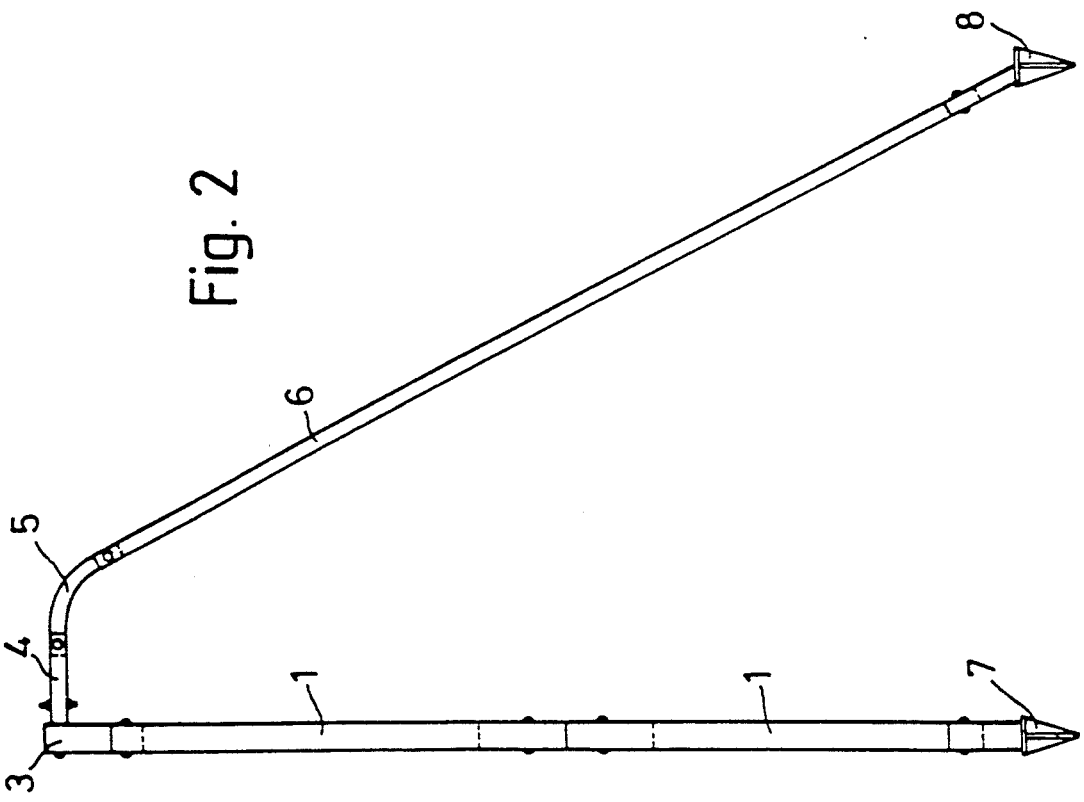

SPORTS EQUIPMENT

This invention relates to sports equipment.

With sports such as football, association and rugby, water polo, hand ball, and hockey, and where the objective is to direct a ball or the like between uprights and either below or over a crossbar, it is the case that the sport is played at both a junior and a senior level, and where posts and crossbars of particular size are required to suit different age groups at a junior level and to suit the sport when played at a senior level.

With such as association football, it is played to a considerable degree indoors, requiring goal posts and cross-bars of a particular suitable size.

In yet another context, and particularly with association football, goals are frequently purchased for practice and recreational purposes for location in, for example, a domestic garden and for use, particularly, by juniors of a variety of age groups. Here again, goals of a particular size to suit the age group of the junior and intended location in a garden, are required. Hitherto, it has been the case that uprights and crossbars have been produced of a particular size to suit one intended purpose, and which, consequently, are not able to serve any other purpose.

With goals for sports such as association football, there is either the advisability or the necessity of securing a net to the goal posts and crossbar. Conventionally, and particularly with metal crossbars and goal posts, hook members have been provided secured such as by welding or screwing and on to which the edge of the net is hooked. The instances of damage to or breakage of such hook members are high, and particularly with junior football where repair is not feasible, it is more often than not the case that resorting to tying the net to the goal posts and crossbar cannot be avoided. Metal hooks also constitute a hazard when on goal posts, by being a source of potential injury. It is an object of the invention to provide a means of securing a net to goal posts and crossbars that avoids those disadvantages referred to above.

According to a first aspect of the invention, a means of securing a net to goal posts and crossbars comprises a fitting having a first part to engage in and behind a hole formed in the wall of a goal post or crossbar, extending to a shoulder at the end of a second part to lie externally of the goal post or crossbar and having a hook-like formation to create a recess in which an edge of a net can be engaged, there being an axial hole through the first and second parts, and a rod-like component inserted through the holes to ensure the engagement of the first part behind the hole.

Thus, the fitting can be a relatively simple moulding of an appropriate plastics material. The first part may be of simple wedge or conical section to provide an abutment shoulder, and of sufficient resilience to allow it to be pressed through the hole for the shoulder to engage behind the edge of the hole. Alternatively, the first part may be provided with outwardly splayed fingers that deflect as the first part is passed through the hole and spring out to engage behind the edge of the hole. A still further possibility is to provide a camming device on the first part, such that when inserted in the hole rotation of the fitting causes the locking of the fitting in the hole.

The second external part of the fitting may be one or more hook-like components that are inclined towards the first part. Thus the arrangement can be that pressing the first part through the hole can bring hook-like components into contact with the goal post or crossbar to trap the fitting in place, or an external abutment on the fitting can be provided to trap the fitting in place and locate the hook-like components in close proxiimity to the exterior of the goal post or crossbar. Thus, with an appropriate number of such fittings secured to the goal posts and crossbar, the edge of the net can be engaged with the fittings with certainty of security, and can be removed without difficulty. Of considerable benefit is that the fittings being of relatively low cost, the provision of spare fittings constitutes no difficulty, and a damaged or broken fitting can be replaced with considerable ease at the point that the net is being secured in place. Equally advantageous is that with the hook-like members fitting closely against the goal posts, they cannot be used as an aid to someone attempting to climb the goal post.

It is a second object of the invention to provide in combination a means of securing a net, and goal posts and crossbars adapted to receive said means, which goal posts and crossbars have considerably greater versatility than has hitherto been the case.

According to a second aspect of the invention, a goal comprises a net securing means as has been above defined, in combination with posts and crossbars each formed from a number of hollow members suitably interconnected, and whereby a required number of goal post members can be combined to provide a goal post of required height, and a required number of crossbar members can be combined to provide a crossbar of a required length, and there being a junction member to enable the connection of each end of the crossbar to a respective goal post, said posts and crossbars having strategically located holes therein to receive said net securing means.

For simplicity, a basic construction can be provided and formed by two goal post members of a required height, and two identical crossbar members combined to form a crossbar of a required length. Goal post extension members can then be provided to create a goal post of a different required height, and a crossbar extension member provided to create a crossbar of a different required length. Perhaps apart from senior sport where goals of a particular size are mandatory, and particularly for junior sport and leisure/practice, manufacture can be simplified considerably by making identical goal post and crossbar members, and when a required number of goal post and crossbar members can be combined to create a goal of a size to suit the user. Thus, the members may be lengths of box or tubular cross-section of an appropriate plastics materials, and which can be secured in abutting end-to-end relationship by connecting members of corresponding cross-section, dimensioned to be a sliding fit within adjacent goal post or crossbar members and secured by pin or bolt means extending through co-operating holes in the goal post or crossbar members and the connecting members. Similarly, the junction members can be of elbow shape and have a spigot of a cross-section to be a sliding fit in a respective crossbar and goal post member, and secured by pin or bolt means extending through co-operating holes in the crossbar and goal post members, and junction members respectively.

It will therefore immediately be apparent that the invention enables the provision of goal posts and crossbars of any required height and length to suit indoor and outdoor use, at both a junior and a senior level, for actual play or for practice and recreational purposes.

The invention also provides several noticeable practical advantages. Thus, a requisite number of members can first be purchased to suit a particular intended use, and additional members subsequently purchased to suit a different use. In many areas of use, an assembled goal cannot be left in situ and whilst not being used. With goal posts and cross-bars of fixed height and length, there are attendant storage problems, whereas with the invention ready dismantling of the goal posts and cross-bars into their individual members greatly facilitates their storage ready for their next use.

To enable the goal posts to be held in an upright position, and in an outdoor use, it is preferred to provide a mounting member in the form of a ground spike, the upper end of which is a spigot of corresponding section to a goal post member and dimensioned to be a sliding fit in the lower end of the goal post member. Thus, with the spike driven into the ground at the required position, the respective goal post can simply be slid on to the mounting member, and if required, secured by suitable pin or bolt means.

When used indoors, it is frequently so that sports halls are provided with a number of strategically located screwed sockets sunk into the floor. Thus, a mounting member with a screwed stem can be provided, the mounting member again being of corresponding cross-section to the goal post members and dimensioned to be a sliding fit therewithin, and the screwed stem engaged with an appropriate socket.

To further assist in holding goal posts upright, rearwardly disposed stanchions can be provided. Here again, and hitherto, stanchion members to suit goal posts of one height have been provided, whereas with the invention, and after the manner described above in relation to goal posts and crossbars, stanchions may be formed from a number of members of appropriate length to suit a particular height of goal post, the junction member between the goal posts and the crossbar having a third rearwardly extending leg to engage a short connecting piece, engaged by an arcuate or angled member the opposite end of which is connected to the uppermost stanchion member. When used outdoors, a stanchion ground spike can be provided having an angled mounting member to be a sliding fit in the lowermost stanchion member. When used indoors a screwed stem with an angled mounting member can be provided, to engage a strategically located screwed socket in the floor.

The versatility of the goal of the invention will readily be appreciated. With the goal post and crossbar members being of identical section and length, a first purchase can be limited to the numbers required to provide a goal of a first small size and additional members subsequently purchased as a need arises to provide a goal of a larger size. Equally and with the user in posession of the number of members required to provide a goal of a maximum size can produce a much smaller goal for recreational or practice purposes of a smaller size simply by using the correct smaller number of components. Given the nature of the construction and material, the goals of the invention can readily be dismantled and transported with the considerable benefit that that provides in being able to move with relative ease a goal from its location for use and its transport to a point of safe storage.

The invention will now be described in detail with reference to the accompanying drawings in which:

FIG. 1 is a front elevation of a goal in accordance with the invention;

FIG. 2 is a side elevation of FIG. 1;

FIG. 3 is a front elevation of a means of securing a net; and

FIG. 4 is a side elevation of FIG. 3.

In FIGS. 1 and 2 a goal is formed by goal post members 1 and crossbar members 2 each of boxed section and formed from an appropriate relatively rigid plastics material. The adjacent members 1 and adjacent members 2 can readily be secured together simply by inserting a connecting member of one member into the ends of the adjacent members with pin means passing through the members and the connecting members to secure them against accidental disconnection. Corner members 3 are provided to secure the uppermost post member 1 to the outermost crossbar member 2, the corner member of L-shape having identically dimensioned box like legs each with a spigot to insert into the respective uppermost goal post member 1 and outermost crossbar member 2. To the rear of each corner member 3 is a spigot 4 to engage in a connecting member 5 itself to be connected to a rearward stanchion 6 to extend to the ground, pin means again being provided to secure the corner members to the goal post and crossbar members, and to secure the connecting member 5 to the rearward spigot on the corner unit and the downwardly extending stanchion.

In its outdoor application as shown in the drawing, ground spikes 7 are provided each with a vertical box sectioned spigot to engage the lowermost goal post member, and ground spikes 8 provided with an angled spigot to engage the lower end of the stanchion members. Here again pin means are provided to secure the ground spikes to the respective goal post and stanchion members.

Thus, in its simplest form, a single goal post member can be provided to each side and two crossbar members to provide a goal of smallest dimension and such as would suit for example use in domestic gardens and for use by small children. Thus as a child grows and a larger goal is needed it is simply a case of adding addition goal post members and additional crossbar members to produce a goal of required size. In other applications and in organised sports useage at large, different sports use different size goals, either to suit the sport or to suit the age group of the participants. Here it is simply a case of selecting the correct number of post members and crossbar members and with an appropriate stanchion of required length to generate a goal of any required size and to suit any required age group.

An added advantage of the construction of the invention is the ability of the goal to serve the secondary purpose of being a shelter. Frequently, for example with the game of football, the collection of components to produce a goal of a size suited to practice can be sited alongside a pitch, and by providing suitably shaped connecting member 5, a generally box like frame can be generated to be overlaid by an impervious sheeting and then to serve as a shelter for officials (trainer and the like) and substitute players and to shelter them from inclement weather.

In FIGS. 3 and 4 a means of securing a net to a goal post and crossbar is portrayed, the means being formed by a first part 9 of generally wedge shape and with splayed fingers 10 extending to a shoulder at the end of a second part 11 carrying hook-like formations 12. Preferably an axial hole is provided through the first and second members to receive a rod 13. Thus, with the securing means formed from an appropriate relatively resilient plastics material, the first part can be introduced to a hole through a goal post or crossbar member and forced into it, the fingers depressing as the first part passes into the hole and springing out behind the hole to hold the securing means to the post or crossbar. When provided, the rod 13 again of an appropriate plastics material can be forced down the axial hole to ensure that the fingers are maintained in a splayed condition and ensure the security of the connection of the securing means to the post or crossbar. With a number of such securing means in place, and with the ends of the hook-like formations in close proximity to the surface of the post or crossbar, a net can be secured in place by forcing an appropriate strand of the net past the end of a hook-like projection and when it is held within the hook-like projection. The removal of the net can be effected with equal simplicity, by simply pulling the strand past the end of the hook-like formation.

It will be recognised that such a securing means can readily be applied to the goal described hereinabove in relation to FIGS. 1 and 2 but has equal applicability to goal posts and goal crossbars of other constructions.

This aspect of the invention therefore provides a notable improvement over traditional methods of securing nets in place, the construction, being such that the securing means can if required be removed but, and particularly when the rod 13 is provided, cannot readily be removed and hence deters theft.

I claim:

1. A securing means for attaching a net to the posts and crossbar of a sports goal, comprising a first part to said securing means of a shape to constitute an engagement means, said first part exiting to a shoulder from the opposite side of which extends a second part to said securing means, said second part having a number of hook-like formations extending from its outer free end towards said shoulder, there being an axial bore through said first and second parts of the securing means to receive a rod-like component, and whereby said first part is insertable through and engageable behind, a hold in a post or crossbar, and said rod is insertable down the axial bore in said first and second parts to ensure engagement of said first part behind the hole in the post or crossbar.

2. A securing means as in claim 1, wherein said first part is of wedge or conical section to constitute an engagement means, and this is resilient to enable it to be pressed through, and engage behind, the hole in the post or crossbar.

3. A securing means as in claim 1, wherein said first part is formed with outwardly splayed and deflectable fingers in the direction away from said shoulder, and whereby said fingers can deflect to allow said first part to pass through said hole and spring out to engage behind said hole in a post or crossbar.

4. A securing means as in claim 1, wherein said first part is formed with a camming device able to engage behind said hole in a post or crossbar following insertion of said first part and its rotation.

5. A securing means as in claim 1, wherein said hook-like formations are inclined outwardly in a direction towards said shoulder, and terminate in close proximity to said shoulder.

6. A sports goal in combination with securing means as in claim 1, said sports goal comprising posts and a crossbar each formed from a number of hollow members suitably interconnected to provide a required height of post and a required length of crossbar, said posts and crossbar being interconnected by an appropriate interconnecting junction member, said post members and said crossbar members each being provided with a number of strategically positioned holes to receive said securing means.

* * * * *